US012540069B2

(12) United States Patent
Bennett

(10) Patent No.: US 12,540,069 B2
(45) Date of Patent: Feb. 3, 2026

(54) FUEL HEAD ASSEMBLY FOR HYDRAULIC FRACTURING

(71) Applicant: Daniel Bennett, Sayre, OK (US)

(72) Inventor: Daniel Bennett, Sayre, OK (US)

( * ) Notice: Subject to any disclaimer, the term of this patent is extended or adjusted under 35 U.S.C. 154(b) by 0 days.

(21) Appl. No.: 18/808,548

(22) Filed: Aug. 19, 2024

(65) Prior Publication Data

US 2025/0059019 A1 Feb. 20, 2025

Related U.S. Application Data

(60) Provisional application No. 63/520,369, filed on Aug. 18, 2023.

(51) Int. Cl.
*B67D 7/04* (2010.01)
*B67D 7/36* (2010.01)

(52) U.S. Cl.
CPC ........... *B67D 7/0401* (2013.01); *B67D 7/362* (2013.01); *B67D 2007/0444* (2013.01)

(58) Field of Classification Search
CPC . B67D 7/04; B67D 7/362; B67D 7/78; B67D 7/0401
See application file for complete search history.

(56) References Cited

U.S. PATENT DOCUMENTS

| | | | |
|---|---|---|---|
| 7,938,151 B2 | 5/2011 | Hockner | |
| 9,346,662 B2 | 5/2016 | Van Vliet et al. | |
| 10,029,906 B2 | 7/2018 | Van Vliet et al. | |
| 11,286,154 B2 | 3/2022 | Van Vliet et al. | |
| 11,827,421 B2 * | 11/2023 | Shock | F02M 37/04 |
| 2011/0197988 A1 * | 8/2011 | Van Vliet | B67D 7/04 141/1 |
| 2021/0213827 A1 * | 7/2021 | Sever | B60K 15/03006 |

FOREIGN PATENT DOCUMENTS

| | | | |
|---|---|---|---|
| GB | 2333769 A * | 8/1999 | F16K 17/196 |

* cited by examiner

*Primary Examiner* — Timothy P. Kelly
(74) *Attorney, Agent, or Firm* — Dunlap Codding, P.C.

(57) ABSTRACT

A fuel head assembly for a fuel tank has a fuel head body, an inlet connector, an inlet tube, an overflow tube, and a fuel level sensor. An upper end of the fuel body has an inlet port, a sensor port, an overflow port, and a vent port. The lower end of the fuel head body is connectable to the fuel tank. The inlet connector is connected to an upstream end of the inlet port. The inlet tube is connected to a downstream end of the inlet port. The inlet tube extends into the fuel tank. The overflow tube is connected to the overflow port. The fuel level sensor is positioned in the fuel sensor port and has a portion extending into the fuel tank.

13 Claims, 6 Drawing Sheets

FUEL HEAD ASSEMBLY FOR HYDRAULIC FRACTURING

CROSS-REFERENCE TO RELATED APPLICATIONS

This application claims the benefit of U.S. Provisional Application No. 63/520,369, filed Aug. 18, 2023, which is hereby incorporated herein by reference in its entirety.

BACKGROUND

Hydraulically fracturing subterranean formations to increase oil and gas production has become a routine operation in the petroleum industry. In hydraulic fracturing, a fracturing fluid is injected through a wellbore into the formation at a pressure and flow rate sufficient to overcome the overburden stress and initiate a fracture. The fracturing fluid may be a water-based liquid, an oil-based liquid, a liquefied gas such as carbon dioxide, a dry gas such as nitrogen, or a combination of liquefied and dry gases. It is most common to introduce a proppant into the fracturing fluid, whose function is to prevent the created fractures from closing back down upon themselves when the fracturing pressure is released. The proppant is suspended in the fracturing fluid and transported into a fracture. Proppants in conventional use include 20-40 mesh size sand, ceramics, and other materials that provide a high-permeability channel within the fracture to allow for a greater flow of oil or gas from the formation to the wellbore. Production of petroleum can be enhanced significantly by the use of these techniques.

Several blenders are used to mix the fracturing fluid, and multiple pumps are used to pressurize the fracturing fluid. A diesel engine drives each piece of equipment. Once the process of fracturing a well is initiated, it should be continued, or the process may have to be repeated at great expense. Therefore, the engines are required to run for an extended period, which requires the fuel tanks of the engines to be refilled during the fracturing process.

Previously, fuel was maintained in the fuel tanks by discharging fluid from a fuel source into each fuel tank one after the other. More recently, the fueling process has been automated, so fuel is released into the fuel tanks from the source upon the level of the fuel reaching a predetermined level. While automating the process has provided many benefits, it can lead to dangerous situations if the fuel hoses and hose connections are not adequately sealed and monitored for leaks. Fuel leaks can cause fires or lead to stopping the fracturing process. One of the most prominent points of fuel leaks is where the fuel hoses connect to the fuel tanks.

To this end, an improved fuel head is needed to reduce the chances of leakage. It is to such an improved fueling head that the inventive concepts disclosed herein are directed.

DETAILED DESCRIPTION OF EXEMPLARY EMBODIMENTS

Figure 1:
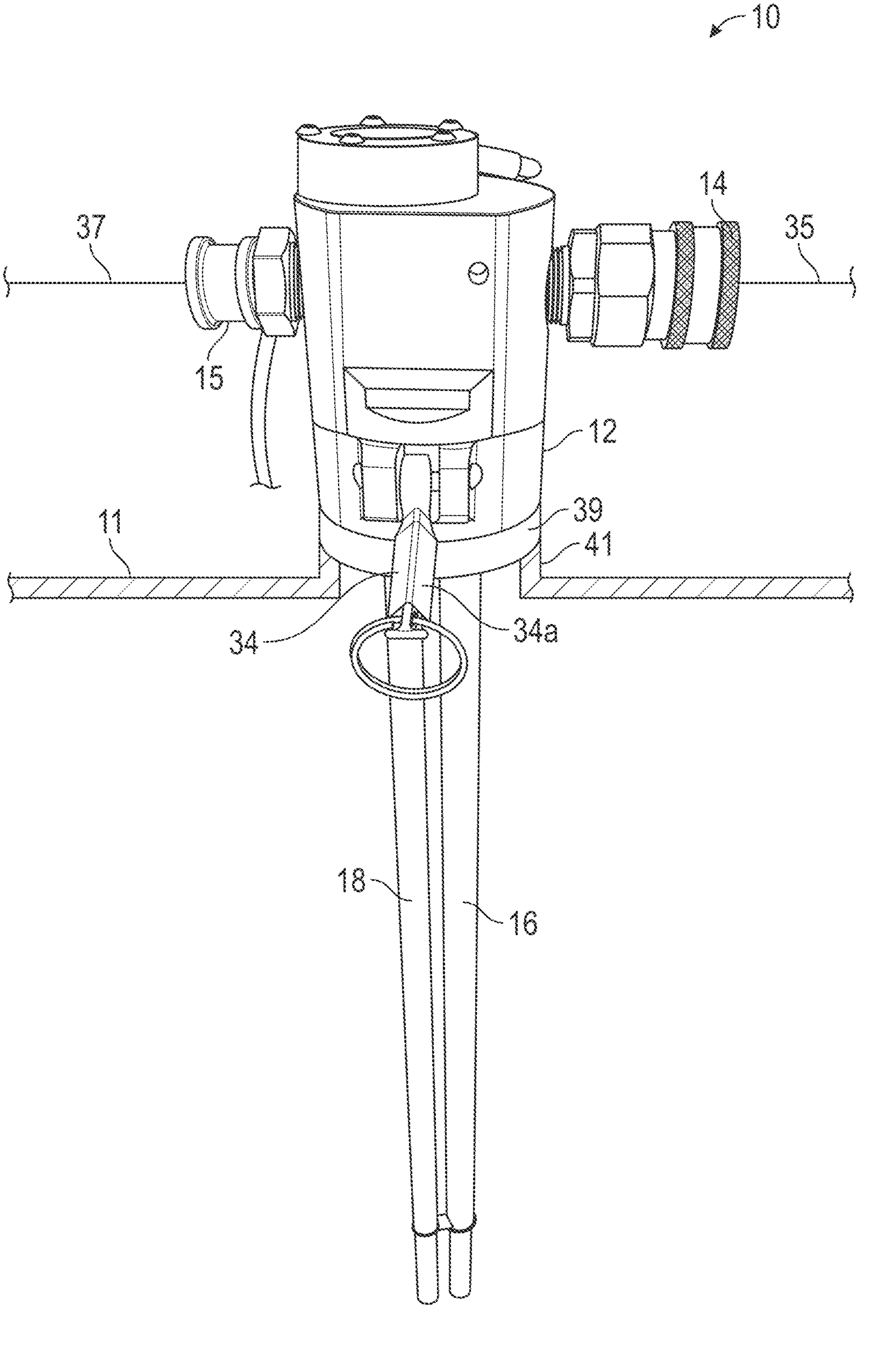
FIG. 1 is a partial diagrammatic perspective view of a fuel head assembly constructed in accordance with the inventive concepts disclosed herein connected to a fuel tank.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein are for the purpose of description and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the instant disclosure may be practiced without these specific details. In other instances, well-known features have not been described in detail to avoid unnecessarily complicating the instant disclosure.

As used herein, the terms “comprises,” “comprising,” “includes,” “including,” “has,” “having,” and any variations thereof are intended to cover a non-exclusive inclusion. For example, a process, method, article, or apparatus that comprises a list of elements is not necessarily limited to only those elements and may include other elements not expressly listed or inherently present therein.

Unless expressly stated to the contrary, “or” refers to an inclusive or and not to an exclusive or. For example, a condition A or B is satisfied by any one of the following: A is true (or present) and B is false (or not present), A is false (or not present) and B is true (or present), and both A and B is true (or present).

In addition, the use of the “a” or “an” is employed to describe elements and components of the embodiments disclosed herein. This is done merely for convenience and to give a general sense of the inventive concepts. This description should be read to include one or at least one, and the singular also includes the plural unless it is obvious that it is meant otherwise.

As used herein, qualifiers like “substantially,” “about,” “approximately,” and combinations and variations thereof are intended to include not only the exact amount or value that they qualify but also some slight deviations therefrom, which may be due to manufacturing tolerances, measurement error, wear and tear, stresses exerted on various parts, and combinations thereof, for example.

Finally, as used herein, any reference to “one embodiment” or “an embodiment” means that a particular element, feature, structure, or characteristic described in connection with the embodiment is included in at least one embodiment.

The appearances of the phrase "in one embodiment" in various places in the specification are not necessarily all referring to the same embodiment.

Fuel delivery systems are utilized to deliver fuel to multiple fuel tanks of various pieces of equipment at a well site during hydraulic fracturing of a well. The fuel delivery systems may have a control center housed in a portable trailer. The fuel delivery systems include a fuel supply in one or more portable storage tanks. A pump may be operably connected to each storage tank for discharging fuel from the storage tank. The fuel may be directed to a manifold used to distribute fuel to each fuel tank. Hoses extend from the manifold to each of the fuel tanks. At the fuel tanks, the hoses are connected to a fuel head, which interconnects the hose to an inlet of the fuel tank. Valves are interposed in the manifold to control the fuel flow and permit the independent operation of each hose.

Figure 2:
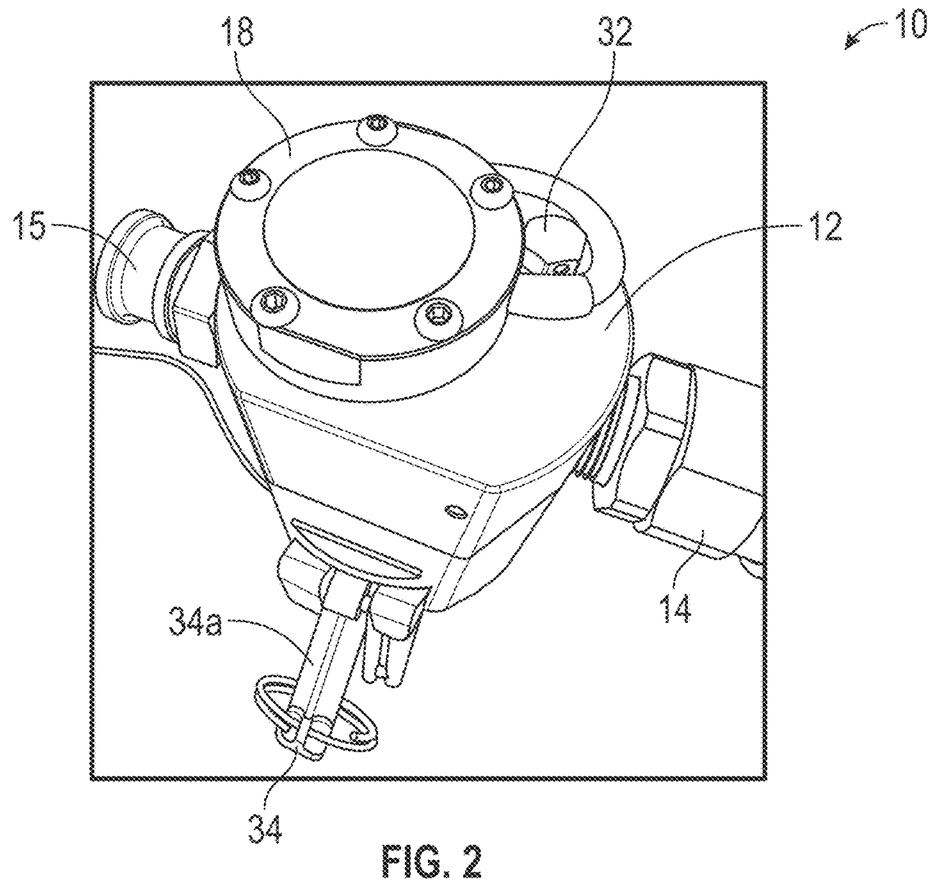
FIG. 2 is an enlarged perspective view of the fuel head assembly of FIG. 1.
Figure 3:
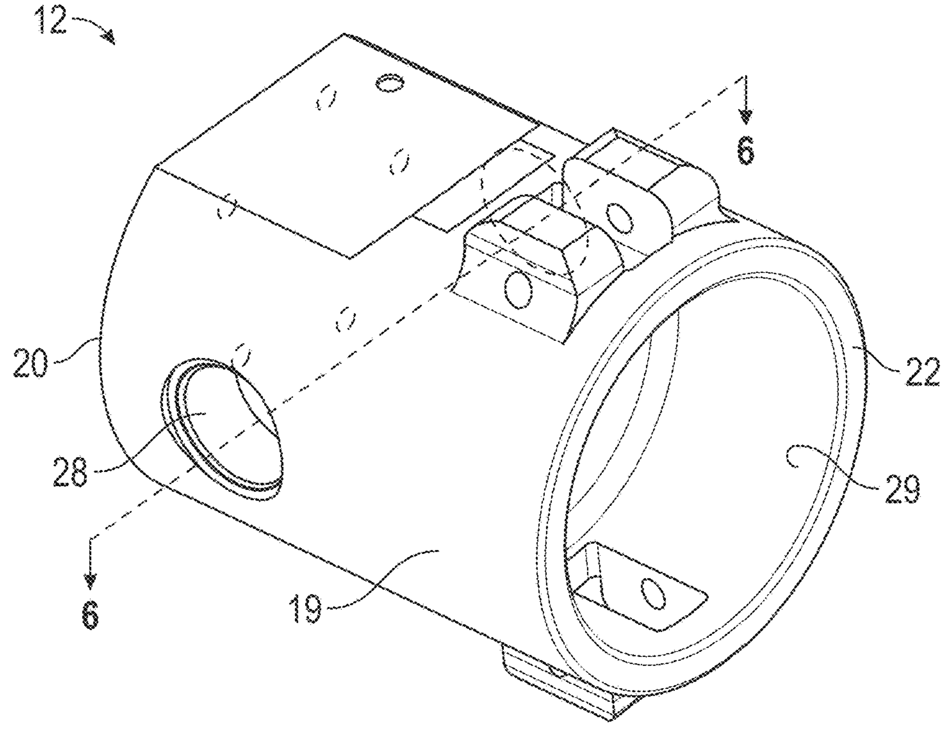
FIG. 3 is a perspective view of a fuel head body constructed in accordance with the inventive concepts disclosed herein.
Figure 4:
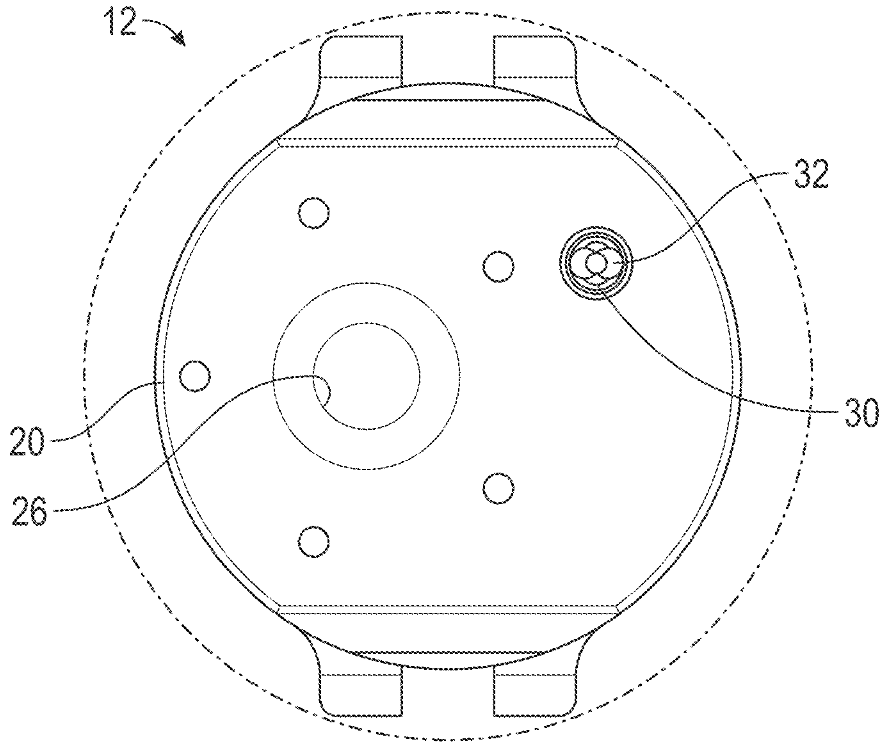
FIG. 4 is a top plan view of the fuel head body.
Figure 5:
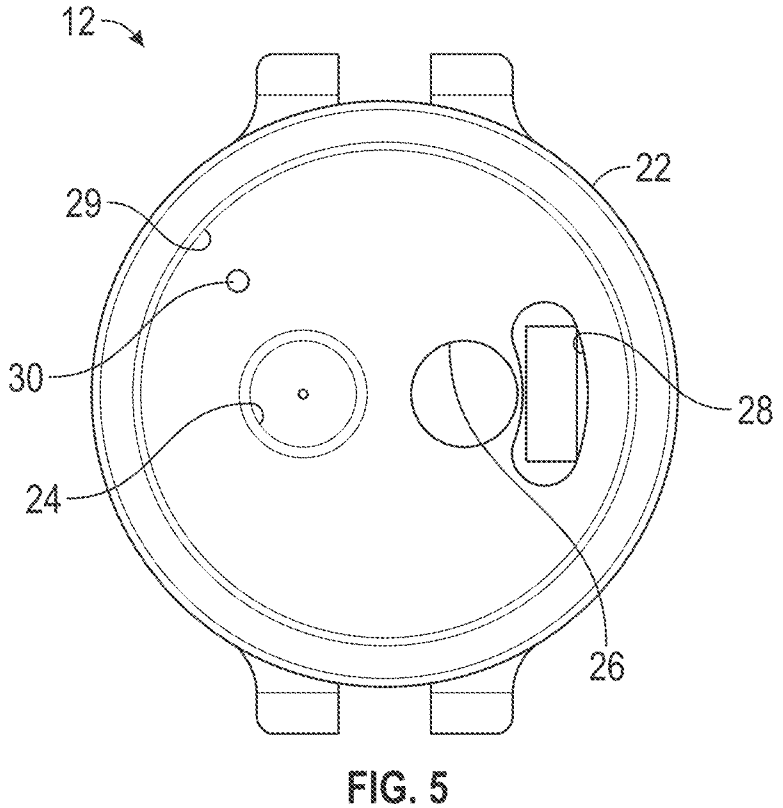
FIG. 5 is a bottom plan view of the fuel head body.
Figure 6:
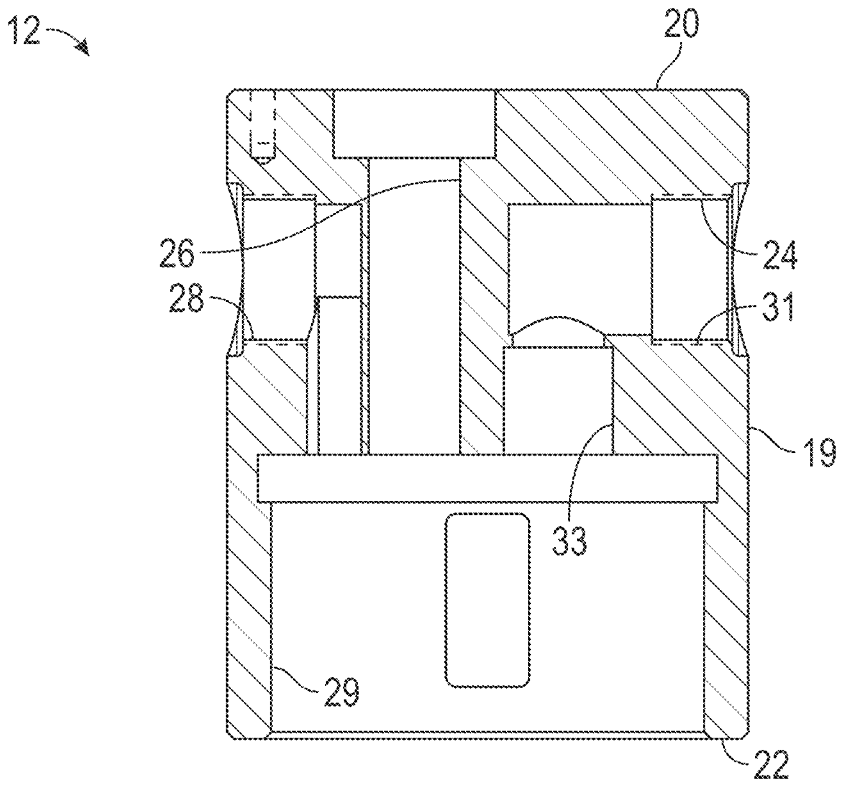
FIG. 6 is a sectional view taken along line 6-6 of FIG. 3.
Figure 7:
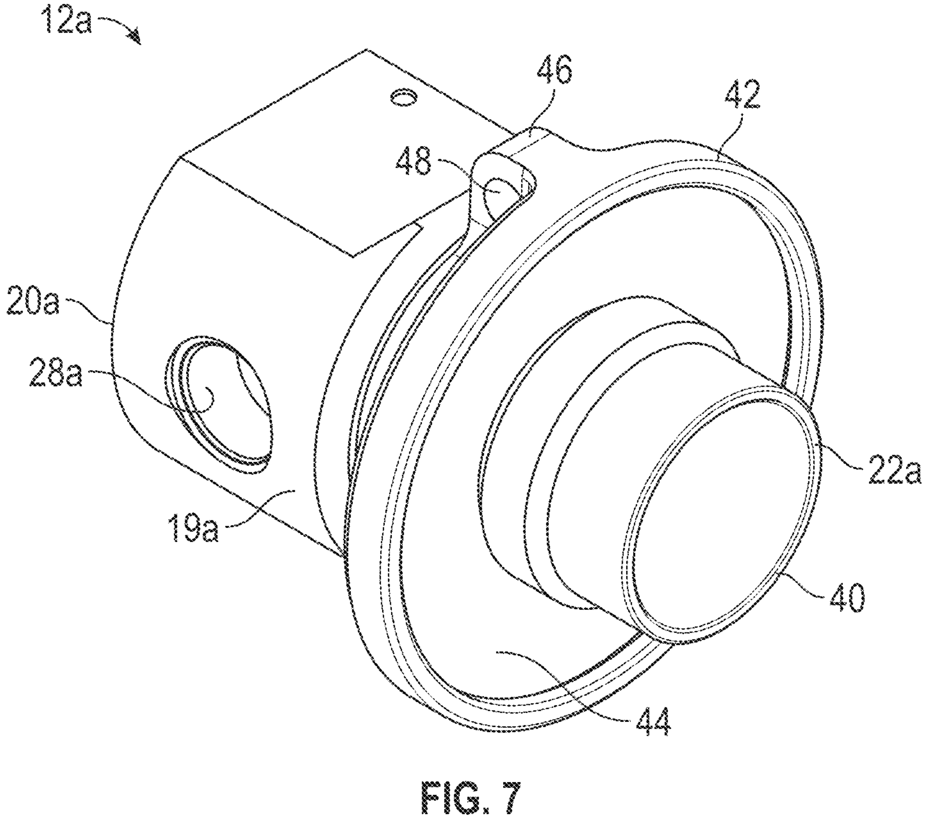
FIG. 7 is a bottom perspective view of another embodiment of a fuel head body constructed in accordance with the inventive concepts disclosed herein.
Figure 8:
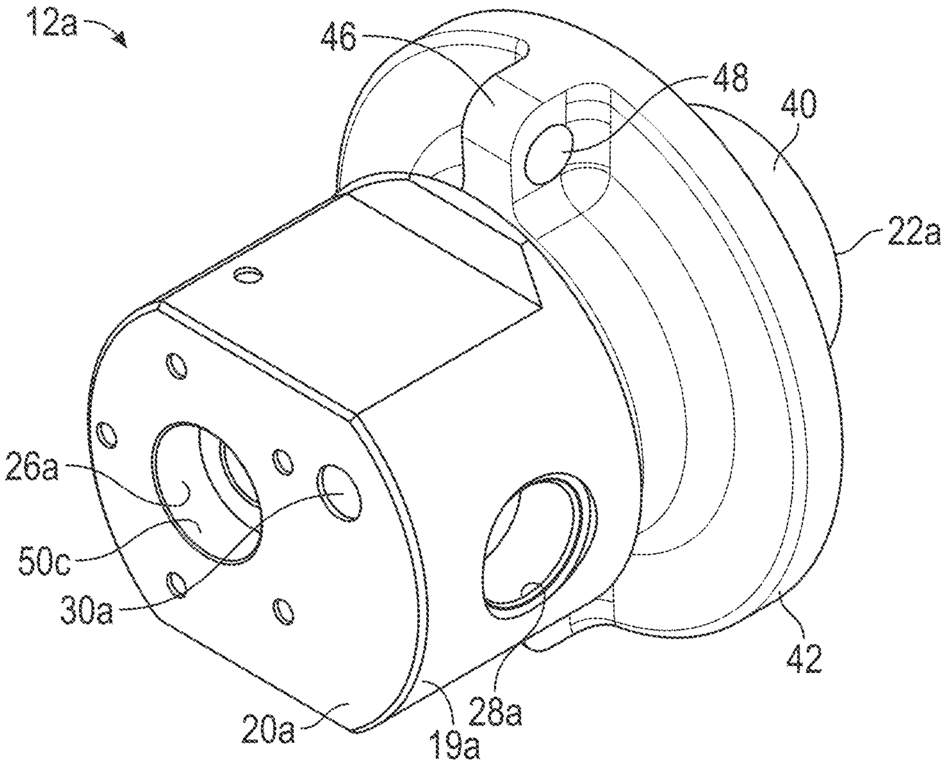
FIG. 8 is a top perspective view of the fuel head body of FIG. 7.
Figure 9:
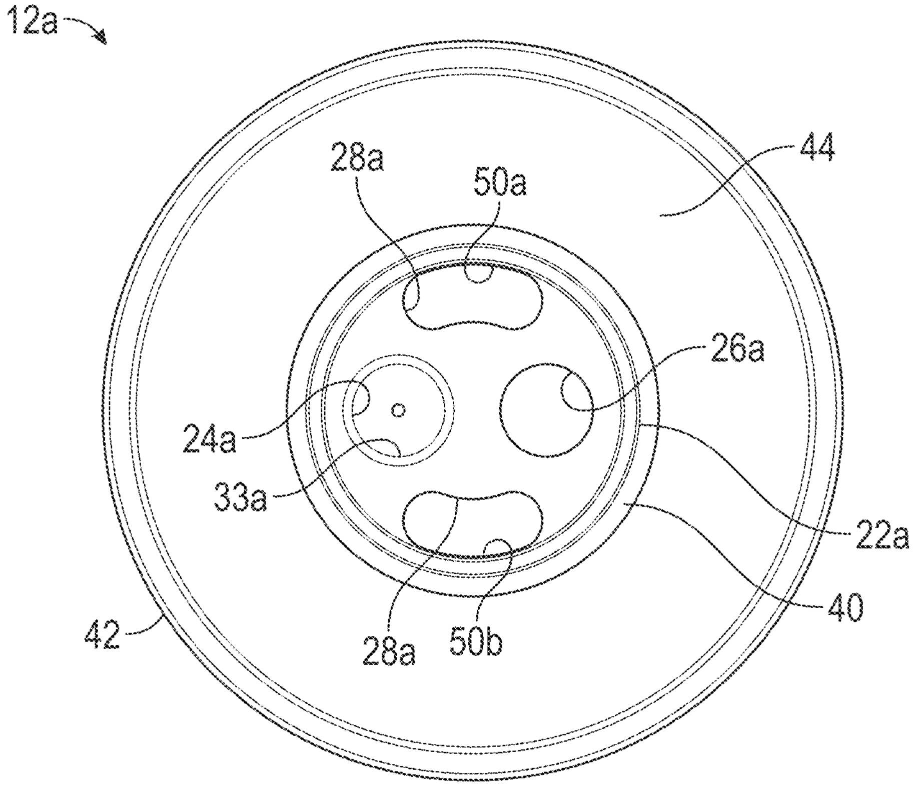
FIG. 9 is a bottom plan view of the fuel head body of FIG. 7.
Figure 10:
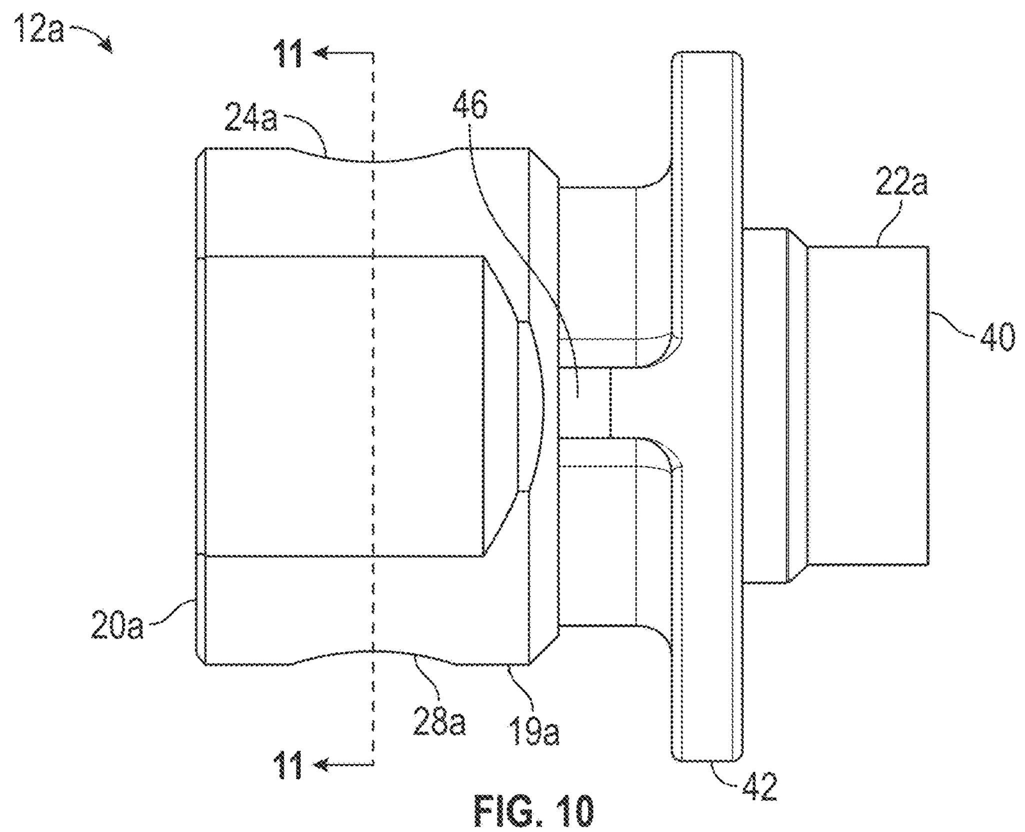
FIG. 10 is a side elevational view of the fuel head body of FIG. 7.
Figure 11:
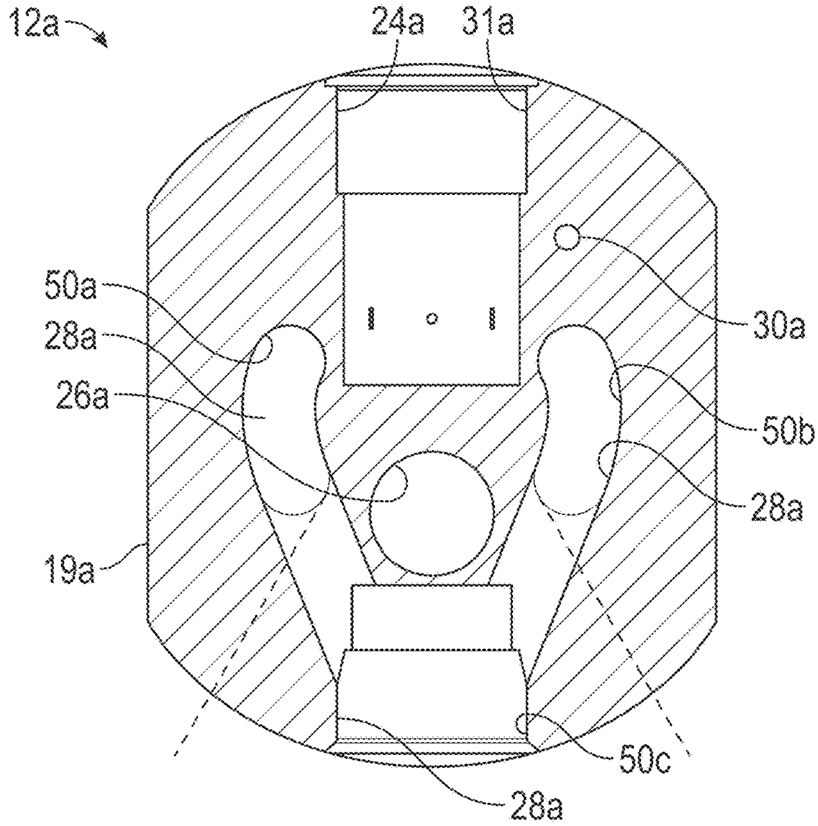
FIG. 11 is a sectional view taken along line 11-11 of FIG. 10.

Referring now to the drawings, and more particularly to FIGS. 1 and 2, a fuel head assembly 10 for a fuel tank 11 constructed in accordance with the inventive concepts disclosed herein is shown. The fuel head assembly 10 includes a fuel head body 12, an inlet connector 14, an overflow connector 15, an inlet tube 16, and a fuel level sensor 18.

Referring now to FIGS. 1-6, the fuel head body 12 includes an outer side, 19, an upper end 20, and a lower end 22. The upper end 20 of the fuel head body 12 has an inlet port 24, a sensor port 26, an overflow port 28, and a vent port 30. The inlet port 24 is configured at an upstream end 31 to mate with the inlet connector 14 and at a downstream end 33 to mate with the inlet tube 16. The inlet connector 14 permits a quick connection to a hose 35 for fluid connection to the fuel source (not shown). The upstream end 31 of the inlet port 24 intersects the outer side 19 and may be oriented at a 90-degree angle relative to the downstream end 33, which intersects the female portion 29. Also, the diameter of the upstream end 31 may be greater than the downstream end 33 sufficiently to create a backpressure as the fuel flows through the fuel head body 12. For example, the upstream end 31 may have a diameter of ¾ inches, and the downstream end 33 may have a diameter of ⅝ inches.

The inlet tube 16 may have a sufficient length to extend near the bottom of the fuel tank to allow for bottom-to-top filling. An upper end of the inlet tube 16 is secured to the fuel head body 12 to be in fluid communication with the inlet port 24.

The sensor port 26 is configured to receive the fuel level sensor 18. The fuel level sensor 18 may be any suitable fluid sensor, such as an optic sensor, a float sensor, a vibrating level switch, or a pressure transducer. The fuel level sensor 18 communicates with the trailer's control center via a wireless or wired communication channel.

The overflow port 28 intersects the lower end 22 and the outer side 19, where it is configured to mate with the overflow connector 14. The overflow connector 14 permits a quick connection to a hose 37 for fluid connection with a container (not shown) for capturing any overfill.

The vent port 30 intersects the lower end 22 and the outer side 19 and is configured to receive a check valve 32 (FIG. 2), so the vent port 30 functions to vent air and vapor from the fuel tank 11 while the fuel tank 11 is being filled with fuel. The check valve 32 prevents fuel from spilling through the vent port 28 while filling the fuel tank 11.

The lower end 22 of the fuel head body 12 is configured as a female portion 29 to mate with an adapter 39 with a male portion. The adapter 39 is interposed between the fuel head body 12 and an inlet 41 of the fuel tank 11. A quick connect 34 (FIGS. 1 and 2) may be associated with the fuel head body 12 to join the fuel head body 12 to the adapter 39, which is provided a corresponding male connector portion. The quick connect 34 may include a pair of cam arms **34*a* (only one cam arm 34*a* being visible) pivotally connected to the fuel head body 12. The adapter 39 may include a corresponding cam groove and be threaded to the inlet 41 of the fuel tank 11 or otherwise secured to the inlet 41, such as with a strap (not shown). The lower end 22** may be provided in different diameters to accommodate adapters of various sizes.

Referring to FIGS. 7-11, another embodiment of a fuel head body **12*a* is illustrated. The fuel head body 12*a* includes an outer side 19*a*, an upper end 20*a*, and a lower end 22*a*. The upper end 20*a* of the fuel head body 12*a* has an inlet port 24*a*, a sensor port 26*a*, an overflow port 28*a*, and a vent port 30*a*. The inlet port 24*a* is configured at an upstream end 31*a* to mate with the inlet connector 14 and at a downstream end 33*a* to mate with the inlet tube 16. The inlet connector 14 permits a quick connection to a hose 35 (FIG. 1) for fluid connection to the fuel source (not shown). The upstream end 31*a* of the inlet port 24*a* may be oriented at a 90-degree angle relative to the downstream end 33*a*. Also, the diameter of the upstream end 31*a* may be greater than the downstream end 33*a* sufficiently to create a backpressure as the fuel flows through the fuel head body 12*a*. For example, the upstream end 31*a* may have a diameter of ¾ inches, and the downstream end 33*a*** may have a diameter of ⅝ inches.

The inlet tube 16 may have a sufficient length to extend near the bottom of the fuel tank to allow for bottom-to-top filling.

The sensor port **26*a* is configured to receive a fuel level sensor, such as the fuel level sensor 18. The fuel level sensor 18 may be any suitable fluid sensor, such as an optic sensor, a float sensor, a vibrating level switch, or a pressure transducer. The fuel level sensor 18** communicates with the trailer's control center via a wireless or wired communication channel.

The overflow port **28*a* is configured to mate with the overflow connector 14. The overflow connector 14 permits a quick connection to a hose, such as the hose 37, for fluid connection with a container (not shown) for capturing any overfill. The overflow port 28*a* may have a plurality of inlet sections, such as 50*a* and 50*b*, that merge into an outlet section 50*c***.

The vent port **30*a* is configured to receive a check valve 32 (FIG. 2), so the vent port 28*a* functions to vent air and vapor from the fuel tank 11 while the fuel tank 11 is being filled with fuel. The check valve 32 prevents fuel from spilling through the vent port 28*a* while filling the fuel tank 11**.

The lower end **22*a* of the fuel head body 12*a* is configured to mate directly with the inlet 41 of the fuel tank 11. The lower end 22*a* has a male portion 40 configured to be received in the inlet 41 of the fuel tank 11. The lower end 22*a* may have a flange 42 defining an annular face 44. A seal member (not shown), such as a gasket, is positionable along the annular face 44 to form a seal between the fuel head body 12*a* and the inlet 41 of the fuel tank 11 when the fuel head body 12*a* is connected to the fuel tank 11**.

In one embodiment, the fuel head body **12*a* has a pair of ears 46. Each of the ears 46 has a hole 48. The holes 48 are configured to receive the end of a securing device, such as a strap. The strap secures the fuel head body 12*a* to the fuel tank 11**.

Although the presently disclosed inventive concepts have been described in conjunction with the specific language set forth herein, many alternatives, modifications, and variations will be apparent to those skilled in the art. Accordingly, it is intended to embrace all such alternatives, modifications, and variations that fall within the spirit and broad scope of the presently disclosed inventive concepts. Changes may be made in the construction and the operation of the various components, elements, and assemblies described herein without departing from the spirit and scope of the presently disclosed inventive concepts.

What is claimed is:

1. A fuel head assembly for a fuel tank, comprising:

a fuel head body having an outer side, an upper end, and a lower end, the upper end of the fuel body has an inlet port, a sensor port, an overflow port, and a vent port, the lower end of the fuel head body connectable to the fuel tank, the inlet port having an upstream end intersecting with the outer side and a downstream end intersecting with the lower end;

an inlet connector connected to the upstream end of the inlet port;

an inlet tube connected to the downstream end of the inlet port, the inlet tube extending into the fuel tank when the fuel head body is connected to the fuel tank;

an overflow tube connected to the overflow port; and a fuel level sensor positioned in the fuel sensor port and having a portion extending into the fuel tank when the fuel head body is connected to the fuel tank.

2. The fuel head assembly of claim 1, wherein the upstream end has a diameter greater than a diameter of the downstream end.

3. The fuel head assembly of claim 1, further comprising a check valve positioned in the vent port of the fuel head body.

4. The fuel head assembly of claim 1, wherein the lower end of the fuel head body is configured as a female portion to mate with a male portion, and wherein the fuel head assembly further comprises a pair of cam arms pivotally connected to the fuel head body.

5. The fuel head assembly of claim 1, wherein the overflow port of the fuel head body has a plurality of inlet sections that merge into an outlet section, the inlet sections intersect the lower end, and the outlet section intersects the outer side.

6. The fuel head assembly of claim 1, wherein the lower end of the fuel head body has a tubular male portion and a flange defining an annular face.

7. The fuel head assembly of claim 6, wherein the fuel head body has a pair of ears, each of the ears having a hole.

8. A fuel head assembly for a fuel tank, comprising:

a fuel head body having an outer side, an upper end, and a lower end, the upper end of the fuel body has an inlet port, a sensor port, and an overflow port, the lower end of the fuel head body connectable to the fuel tank, the inlet port having an upstream end intersecting with the outer side and a downstream end intersecting with the lower end, and the overflow port has a plurality of inlet sections that merge into an outlet section, the inlet sections intersect the lower end, and the outlet section intersects the outer side;

an inlet connector connected to the upstream end of the inlet port;

an inlet tube connected to the downstream end of the inlet port, the inlet tube extending into the fuel tank when the fuel head body is connected to the fuel tank;

an overflow tube connected to the overflow port; and a fuel level sensor positioned in the fuel sensor port and having a portion extending into the fuel tank when the fuel head body is connected to the fuel tank, wherein the upstream end has a diameter greater than a diameter of the downstream end.

9. The fuel head assembly of claim 8, wherein the lower end of the fuel head body is configured as a female portion to mate with a male portion, and wherein the fuel head assembly further comprises a pair of cam arms pivotally connected to the fuel head body.

10. The fuel head assembly of claim 8, wherein the lower end of the fuel head body has a tubular male portion and a flange defining an annular face.

11. The fuel head assembly of claim 10, wherein the fuel head body has a pair of ears, each of the ears having a hole.

12. A fuel head assembly for a fuel tank, comprising:

a fuel head body having an outer side, an upper end, and a lower end, the upper end of the fuel body has an inlet port, a sensor port, and an overflow port, the lower end of the fuel head body configured as a female portion to mate with a male portion connectable to the fuel tank, the inlet port having an upstream end intersecting with the outer side and a downstream end intersecting with the lower end;

an inlet connector connected to the upstream end of the inlet port;

an inlet tube connected to the downstream end of the inlet port, the inlet tube extending into the fuel tank when the fuel head body is connected to the fuel tank;

an overflow tube connected to the overflow port; and a fuel level sensor positioned in the fuel sensor port and having a portion extending into the fuel tank when the fuel head body is connected to the fuel tank, and a pair of cam arms pivotally connected to the fuel head body, wherein the upstream end has a diameter greater than a diameter of the downstream end, wherein the fuel head body has a vent port and wherein the fuel head assembly further comprises a check valve positioned in the vent port of the fuel head body.

13. The fuel head assembly of claim 12, wherein the overflow port of the fuel head body has a plurality of inlet sections that merge into an outlet section, the inlet sections intersect the lower end, and the outlet section intersects the outer side.

* * * * *